Figure 1:
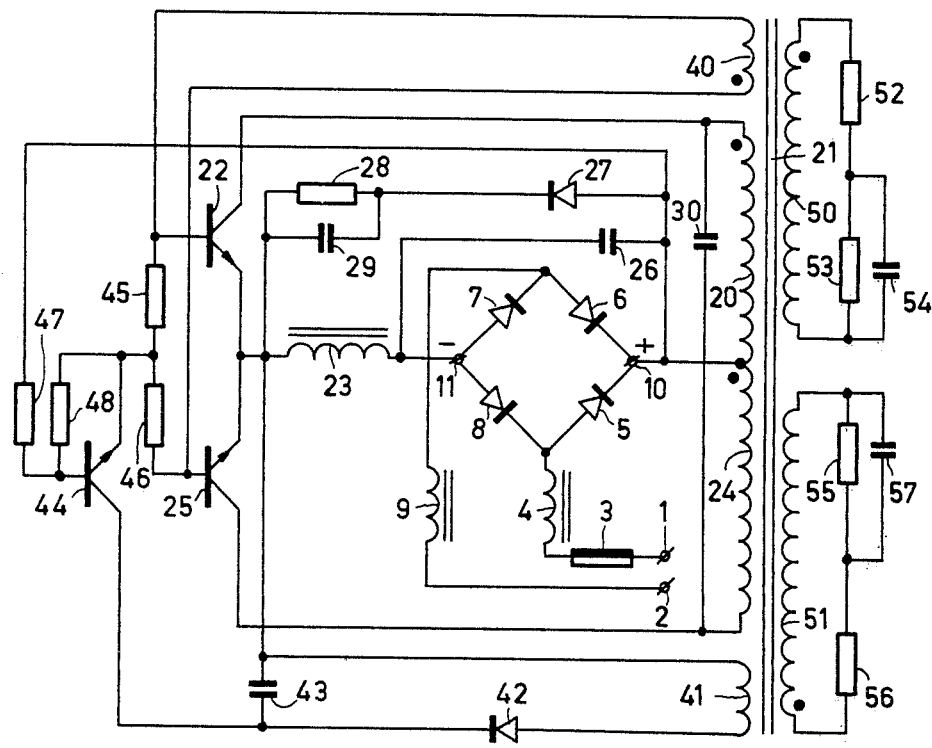

United States Patent [19]

Palmers et al.

[11] 4,353,116

[45] Oct. 5, 1982

[54] DIRECT CURRENT TO ALTERNATING CURRENT CONVERTER

[75] Inventors: Hilbert Palmers; Hubertus M. J. Chermin, both of Eindhoven, Netherlands

[73] Assignee: U.S. Philips Corporation, New York, N.Y.

[21] Appl. No.: 237,052

[22] Filed: Feb. 23, 1981

[30] Foreign Application Priority Data

Mar. 17, 1980 [NL] Netherlands .......................... 8001557

[51] Int. Cl.³ .......................................... H02M 7/537
[52] U.S. Cl. .................................... 363/133; 315/219; 315/225; 363/37
[58] Field of Search ................... 315/219, 225, 227 R; 363/37, 133

[56] References Cited

U.S. PATENT DOCUMENTS

| | | | |
|---|---|---|---|
| 3,009,115 | 11/1961 | Johnson | 363/133 X |
| 3,111,632 | 11/1963 | Murphy | 363/133 X |
| 3,818,312 | 6/1974 | Luursema et al. | 315/219 X |
| 3,829,794 | 8/1974 | Gautherin | 363/133 X |
| 3,973,165 | 8/1976 | Hester | 363/37 X |

Primary Examiner—William M. Shoop
Attorney, Agent, or Firm—Robert T. Mayer; Bernard Franzblau

[57] ABSTRACT

The invention relates to a d.c. to a.c. converter comprising two transistors (22, 25) and an output transformer (21). This converter also includes an auxiliary d.c. voltage source (43) and is provided with an auxiliary winding (40) of the transformer (21) which connects the base of one transistor (22) to the base of the other transistor (25).

According to the invention, the combination of the auxiliary d.c. voltage source (43) and a control circuit of the two transistors (22, 25) comprises a current blocking means (44) such that the converter can be supplied with a pulsed d.c. voltage. Consequently, that converter can be operated from a low frequency a.c. voltage mains via an auxiliary full-wave rectifier (5 to 8), which does not need to have a high value smoothing capacitor.

18 Claims, 2 Drawing Figures

DIRECT CURRENT TO ALTERNATING CURRENT CONVERTER

The invention relates to a direct current to alternating current converter having two input terminals for connection to a source of direct current and an output transformer. The two input terminals are interconnected on the one hand by a first series arrangement of at least a first transistor and a first primary winding of the transformer and on the other hand by a second series arrangement of at least a second transistor and a second primary winding of the transformer. A third winding of the transformer connects the base of the first transistor directly to the base of the second transistor. A control circuit for the two transistors—which includes the base connection of the two transistors—is predominantly supplied from an auxiliary d.c. voltage source. A direct connection is here understood to mean a connection which does not comprise any further circuit elements. The invention also relates to a combination including such a direct current to alternating current converter.

A known direct current to alternating current converter of the type set forth in the opening paragraph is described in the German "Offenlegungsschrift" No. 2,817,319. That known converter has the disadvantage that it may become defective when the instantaneous d.c. voltage between its input terminals is much lower than the rated d.c. voltage between those terminals.

A relatively low instantaneous voltage between the input terminals of a converter occurs, for example, periodically when that converter is connected to a pulsating d.c. voltage. A low voltage may alternatively occur between the input terminals when the converter is fed from, for example, an accumulator which has one or more defective cells.

It is an object of the invention to provide a direct current to alternating current converter of the type set forth in the opening paragraph that is able to withstand an instantaneous voltage between the input terminals which is much lower than the rated d.c. voltage between those terminals.

According to the invention, there is provided a direct current to alternating current converter having two input terminals for the direct current and an output transformer. The two input terminals are interconnected on the one hand by a first series arrangement of at least a first transistor and a first primary winding of the transformer and on the other hand by a second series arrangement of at least a second transistor and a second primary winding of the transformer. A third winding of the transformer connects the base of the first transistor directly to the base of the second transistor. A control circuit for the two transistors—comprising the base-connection of the two transistors—is predominantly supplied from an auxiliary d.c. voltage source. The invention is characterized in that the combination of the auxiliary d.c. voltage source and the control circuit comprises a current blocking means such that when there is an instantaneous voltage which is less than 5% of the rated, effective voltage between the converter input terminals, the auxiliary d.c. voltage source supplies substantially no current to the control circuit.

This converter has the advantage that it can withstand an instantaneous voltage between its input terminals which is much lower than—namely less than 5% of—the rated d.c. voltage between those terminals.

The following should be noted by way of explanation. In the normal operating condition of the known converter the auxiliary d.c. voltage source will repeatedly render a transistor conductive. This is controlled by the third winding of the transformer in such a way that the first transistor of the two transistors is alternately rendered conductive, the second transistor being simultaneously rendered non-conductive, and that thereafter the second transistor is rendered conductive while the first transistor is simultaneously rendered non-conductive, and so on. That known converter has a fairly high efficiency. The said third winding has a small number of turns. If, however, the instantaneous voltage between the input terminals of that known converter becomes relatively low, the difference in potential between the ends of the third winding also becomes so low that it exercises hardly any influence on the base voltage of the two transistors. This means that the auxiliary d.c. voltage source will then render the two transistors conductive simultaneously. As a result thereof relatively large currents will start flowing through those transistors, which may damage them. These currents become so large because the impedance of the first—and also the second—series arrangement of the converter is then very low due to the fact that the currents in the two primary transformer windings have opposite directions so that the impedance of the transformer is then negligibly small. The situation will become still worse—especially if the auxiliary d.c. voltage source has a large capacitance—when the instantaneous voltage between the input terminals of the converter again assumes a higher value. This is because the auxiliary d.c. voltage source then maintains the two transistors in the conductive state and these dangerous currents will increase still further.

The invention is based on the discovery that the undesired situation can be avoided by activating a current blocking means in the event of a relatively low instantaneous voltage between the input terminals of the converter such that the auxiliary d.c. voltage source can apply substantially no current to the control circuit of the transistors. As a result, the transistors can no longer remain in their conductive state. Thus, in a converter according to the invention the control of the transistors is blocked during the low instantaneous voltages between the input terminals. In that way the risk that dangerously high currents will flow through the circuit is decreased.

When there is a sufficiently high input voltage, a converter embodying the invention operates in a generally similar manner to that described above for the normal operating condition of the known converter.

When a converter according to the invention is operated with a pulsating d.c. voltage, then the converter will not function during the brief, low, instantaneous voltage values. This is in no way objectionable for electric loads connected to the converter which have an integrating character, such as, for example, a lamp or an electric motor.

Blocking the current may, for example, be realized by a rapid discharge of the auxiliary d.c. voltage source by means of a short-circuiting switch connected thereacross, the source being rechargeable in this case.

In a preferred embodiment of a d.c. to a.c. converter according to the invention, the current blocking means includes an auxiliary transistor in the control circuit of the two transistors. The auxiliary transistor is provided with an auxiliary control circuit, and an input branch of the auxiliary control circuit shunts at least the input terminals of the converter. This preferred embodiment has the advantage that it is not necessary to fully discharge the auxiliary d.c. voltage source to obtain the required current blocking.

In a further embodiment of a d.c. to a.c. converter according to the invention, the auxiliary d.c. voltage source comprises a capacitor, and a series arrangement of at least that capacitor and a rectifier is connected across a charging device forming part of the converter. This embodiment has the advantage that the auxiliary d.c. voltage source is of a simple construction and that charging this source can be carried out by the converter itself.

In an improvement of the last-mentioned embodiment the charging device of the auxiliary d.c. voltage source is a fourth winding of the transformer. This has the advantage that the converter can then be of a very simple construction.

In a further embodiment of a d.c. to a.c. converter according to the invention the series arrangement comprising the capacitor and the rectifier also includes a resistor, and the charging device comprises a coil in series with both the first and the second-series arrangements and the capacitance of the capacitor is of such a low value that the current is blocked by a low voltage value of the auxiliary d.c. voltage source. This embodiment has the advantage that the combination of the auxiliary d.c. voltage source and the control circuit need not comprise a further switching element, such as an auxiliary transistor. Also, because of the small capacitance of the capacitor which serves as the auxiliary d.c. voltage source, it is then ensured that the auxiliary d.c. voltage source contains substantially no charge at the instants at which the instantaneous input voltage to the converter is low. This accomplishes the blocking of the current to the control circuit.

It should be noted that a d.c. to a.c. converter is known from U.S. Pat. No. 3,818,312; see FIG. 2 in particular, in which a transformer winding connects the base of a first transistor to the base of a second transistor and in which a direct current source is present which is charged via a rectifier and a resistor from a coil which is located in a common portion of the main electrode circuits of the two transistors of that converter. However, the operation of this prior art converter depends upon a capacitor inserted in series with the connection from the bases of the transistors via the transformer winding. As stated above, the present invention relies upon a direct connection therebetween.

The invention also relates to a combination comprising a d.c. to a.c. converter according to the invention having an output frequency of over 10 kHz, and at least one discharge lamp connected to the output transformer of the converter. This combination has the advantage that it combines a converter which can withstand instantaneous input voltages which are low with a satisfactory efficiency of both the converter and also of the lamp(s), as it is a known fact that at higher frequencies the efficiency of discharge lamps such as, for example, low-pressure mercury vapour discharge lamps is greater than at, for example, 50 Hertz.

The combination may further include a full-wave rectifier auxiliary device having two input terminals connected to a low frequency (e.g. 60 Hz) source of Ac voltage and two output terminals respectively connected to the two input terminals of the converter. This has the advantage that this combination can be directly connected to an a.c. voltage of a low frequency, for example to an a.c. voltage of 50–60 Hz. Then the rectifier-auxiliary device need not include a smoothing capacitor of a high value, as the rather strongly pulsating d.c. voltage which is obtained by means of such a full-wave rectifier-auxiliary device can be directly applied to the input terminals of the converter. According to the invention, that converter has been provided with a system in which the low instantaneous voltages which then occur periodically do not result in dangerously large transistor currents.

Figure 2:
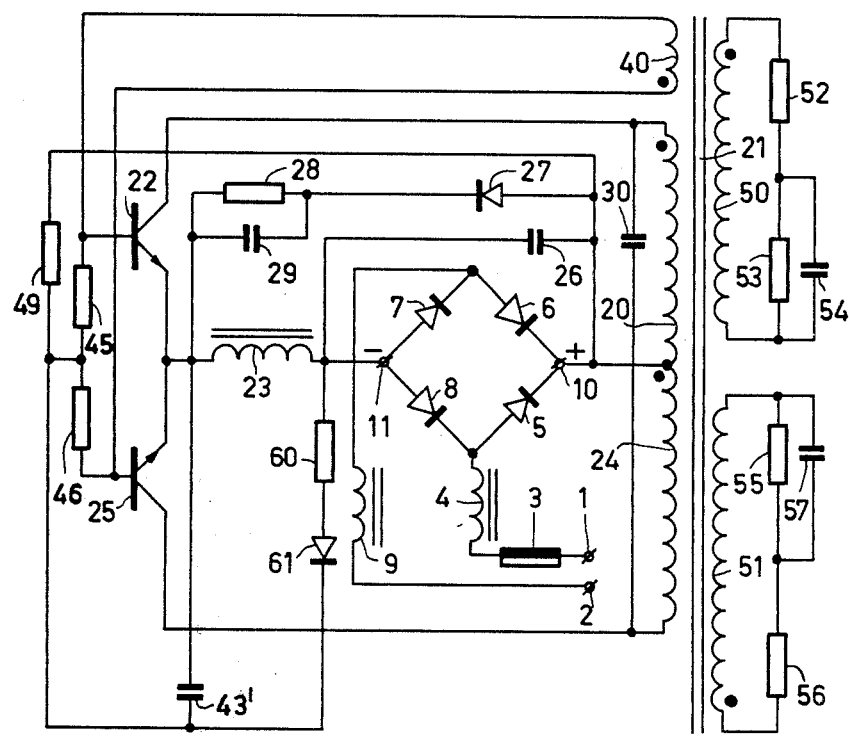

Two embodiments of the invention will now be further explained by way of non-limitative examples with reference to the accompanying drawings, in which:

FIG. 1 shows a first d.c. to a.c. converter according to the invention which is fed via a full-wave rectifier auxiliary device and also supplies energy to a load comprising some discharge lamps, and FIG. 2 shows a second d.c. to a.c. converter according to the invention which is also fed via a similar rectifier-auxiliary device and the load also comprises some discharge lamps.

In FIG. 1 reference numerals 1 and 2 denote input terminals intended to be connected to an a.c. voltage source of approximately 220 Volt, 50 Hz.

The input terminal 1 is connected to a fuse 3. The other side of this fuse is connected to an input terminal of a rectifier bridge 5 to 8, inclusive, via a coil 4. The input terminal 2 is connected to a coil 9, the other side of which is connected to another input terminal of the rectifier bridge 5 to 8. An output terminal 10 of the rectifier bridge forms a positive input d.c. supply terminal of a d.c. to a.c. converter. An output terminal 11 of the rectifier bridge is at the same time a negative input d.c. supply terminal of the converter. The following is a description of that converter.

One end of a first primary winding 20 of an output transformer 21 is connected to the terminal 10 and the other end is connected to the collector of an npn-transistor 22. The emitter of that transistor is connected to terminal 11 via a coil 23.

One end of a second primary winding 24 of the transformer 21 is connected to the terminal 10 and the other end is connected to the collector of a second npn-transistor 25. The emitter of the transistor 25 is connected to the coil 23. The terminals 10 and 11 are interconnected via a low-value capacitor 26 of approximately 0.22 microFarad.

Furthermore, the positive terminal 10 is connected to a junction point between the coil 23 and the emitters of the two transistors via a peak voltage-attenuating circuit consisting of a rectifier 27 in series with a parallel arrangement of a resistor 28 and a capacitor 29. The series combination of the primary windings 20 and 24 is shunted by a capacitor 30. A third winding 40 of the transformer 21 connects the base of the transistor 22 to the base of the transistor 25. In addition, there is a fourth winding 41 of the transformer 21. A series arrangement of a rectifier 42 and a capacitor 43 is connected across this winding 41. The capacitor 43 serves as an auxiliary d.c. voltage source. Furthermore, one side of this capacitor 43 is connected to the junction point between the coil 23 and the emitters of the two transistors 22 and 25 and the other side is connected to the collector of an auxiliary transistor 44. Via a base resistor 45, the emitter of the auxiliary transistor 44 is connected to the base of the transistor 22, and via a base resistor 46 to the base of the transistor 25. A control circuit for the transistor 44 comprises two resistors 47 and 48, which are both connected to the base of transistor 44. In addition, the resistor 47 is connected to the terminal 10 of the converter. The resistor 48 is connected to the emitter of the auziliary transistor 44.

Furthermore, the transformer 21 comprises two secondary windings 50 and 51. A series arrangement of two low pressure mercury vapour discharge lamps 52 and 53 is connected across the winding 50. The lamp 53 is shunted by an auxiliary capacitor 54.

A similar series arrangement of two low-pressure mercury vapour discharge lamps 55 and 56 is connected across the secondary winding 51, the lamp 55 being shunted by an auxiliary capacitor 57.

The described circuit operates as follows. When the voltage of 220 Volt, 50 Hz is connected between the input terminals 1 and 2, a pulsed d.c. voltage is obtained between the terminals 10 and 11 by means of the rectifier bridge 5 to 8, inclusive (full-wave rectifier auxiliary device). Since the capacitor 26 has only a very small capacitance, the instantaneous voltage between terminals 10 and 11 becomes periodically substantially equal to zero Volt.

First, the converter is put into operation via the resistors 45 to 48, inclusive. Thereafter current flows alternately through the first series arrangement consisting of terminal 10, winding 20, the transistor 22, coil 23, terminal 11 and through the second series arrangement consisting of terminal 10, winding 24, transistor 25, coil 23 and terminal 11. The power to control the transistors 22 and 25 is predominantly produced by the auxiliary d.c. voltage source 43, which is charged for this purpose from the fourth transformer winding 41, via the rectifier 42. The capacitor 30 is a capacitor to produce the oscillations of the converter. The control circuit 47, 48 of the auxiliary transistor 44 keeps this auxiliary transistor nearly always in the conductive state. the auxiliary transistor 44 is cut-off only if the voltage between the terminal 10 and the emitter of the transistor 44 decreases to below a predetermined instantaneous value. This is the case when the voltage between the terminals 10 and 11 is less than 5% of the effective rated voltage—220 Volts—between those terminals, that is to say less than approximately 11 Volts. At the low instantaneous voltage value between the terminal 10 and the emitter of the transistor 44, that is to say at a voltage which is still less than the instantaneous voltage between the terminals 10 and 11, the supply of power for the control of the transistors 22 and 25, coming from the auxiliary voltage source 43, is cut-off. The current from source 43 is therefore blocked by the auxiliary transistor 44. When the instantaneous voltage between the input terminals 10 and 11 is high, the auxiliary transistor 44 conducts. The converter supplies the four discharge lamps 52, 53 and 55, 56. The capacitors 54 and 57 are only used to ignite the lamps one after the other, namely first lamp 52 and thereafter 53, and first lamp 56 and thereafter lamp 55, respectively.

In a practical embodiment the resistor 28 has a value of approximately one MOhm, the resistor 45 and the resistor 46 each have a value of approximately 82 Ohm, the resistor 47 of approximately 100 kOhm, the resistor 48 of approximately 10 kOhm. The coil 4 has a value of approximately 0.2 mHenry, the coil 9 of approximately 0.2 mHenry and the coil 23 of approximately 5 mHenry. The capacitors have the following values: Capacitor 26 approximately 0.22 $\mu$Farad, capacitor 43 approximately 680 $\mu$Farad, capacitor 54 approximately 1800 pFarad capacitor 57 approximately 1800 pFarad, and capacitor 30 approximately 15 nanoFarad. Each of the primary windings 20 and 24 of the transformer has approximately 140 turns. The third transformer winding 40 has one turn and the fourth transformer winding 41 has three turns. Each of the two secondary transformer windings 50 and 51 has approximately 365 turns. Each of the lamps is a lamp of 33 Watts so that the converter is loaded with approximately $4 \times 33 = 132$ Watts. The combined luminous flux of the four lamps was approximately 13200 lumen. Approximately 145 Watts is taken from the input terminals 1 and 2 of the arrangement so that the system efficiency of this arrangement is approximately 91 lumen per Watt. The lamps are then operated at approximately 20 kHertz.

If the four lamps are operated at the same lumen value in a conventional manner, using only inductances and capacitors, the wattage consumed is approximately 22% higher. A comparison of the weights of the accessory equipment for the lamps is as follows. In the case of the embodiment shown in FIG. 1, according to the invention, the accessories of the lamps weigh approximately 1 kg, whereas they weigh approximately 3.5 kg in the case of the conventional stabilisation apparatus.

The volume of the accessories of the lamps in the case shown in FIG. 1 is approximately 0.8 dm$^3$ and in the case of the conventional stabilisation apparatus approximately 1.2 dm$^3$.

FIG. 2 shows a second arrangement according to the invention. Corresponding reference numerals refer to the same elements as in FIG. 1. FIG. 2 deviates from FIG. 1 inter alia, as regards the power supply to the auxiliary d.c. voltage source 43', and as regards the connection of that auxiliary d.c. voltage source 43' to the base electrode of the transistors 22 and 25. In addition, the arrangement shown in FIG. 2 includes a resistor 49, of approximately 100 kOhm, one side of which is connected to the terminal 10 and the other side to a junction between the resistors 45 and 46. The converter is started via the resistors 45, 46 and 49.

In the device shown in FIG. 2 the auxiliary d.c. voltage source 43', which is in the form of a capacitor, is included in a series arrangement of a resistor 60 and a rectifier 61, the series arrangement being connected across the coil 23 of the converter. The capacitor 43' is connected directly to the resistor 45 in the base circuit of the transistor 22. In this circuit the capacitance of the capacitor 43' is only 6.8 $\mu$Farad and the resistor 60 has a resistance of approximately 10 Ohm. In this case the voltage across the capacitor 43' exhibits a high ripple voltage, which periodically becomes substantially zero, at least during the short time intervals in which the voltage between the terminals 10 and 11 is less than 11 Volts, that is to say less than 5% of the effective rated voltage—220 Volts—between those terminals. The interruption of the current to the bases of the transistors 22 and 25 now is obtained in that the auxiliary d.c. voltage 43' can then apply almost no current to those bases. In all other respects the operation of the circuit of FIG. 2 is in practice identical to the operation of the circuit shown in FIG. 1. The system efficiency of the circuit shown in FIG. 2 is also approximately 91 lumen per Watt.

The brief interruption of the control of the two transistors 22 and 25 by blocking of the current is always of such a short duration (approximately 4% of each half cycle of the AC supply) that it is not perceptible to the eye at the lamps 52, 53, 55, 56.

The two arrangements described combine a high system efficiency along with the fact that the converters can withstand low instantaneous input voltages, as a result of which the converter can be operated by means of the pulsed d.c. voltage via the terminals 10 and 11.

What is claimed is:

1. A direct current to alternating current converter comprising two input terminals for connection to a source of direct current, an output transformer, means connecting the two input terminals to a first series arrangement including at least a first transistor and a first primary winding of the transformer and by a second series arrangement including at least a second transistor and a second primary winding of the transformer, a third winding of the transformer connecting the base of the first transistor directly to the base of the second transistor, a control circuit coupled to the base electrodes of the two transistors, an auxiliary d.c. voltage source coupled to the control circuit so that the control circuit is predominantly supplied from said auxiliary d.c. voltage source, the combination of the auxiliary d.c. voltage source and the control circuit comprising a current blocking means such that an instantaneous voltage between the input terminals which is less than 5% of the rated effective voltage between those terminals causes the auxiliary d.c. voltage source to supply substantially no current to the control circuit.

2. A direct current to alternating current converter as claimed in claim 1, wherein the current blocking means include an auxiliary transistor in the control circuit of the two transistors, the auxiliary transistor including an auxiliary control circuit having an input branch shunting at least the input terminals of the converter.

3. A direct current to alternating current converter as claimed in claims 1 or 2 wherein the auxiliary d.c. voltage source comprises a capacitor, and means connecting a series arrangement of at least said capacitor and a rectifier across a charging device forming a part of the converter.

4. A direct current to alternating current converter as claimed in claim 3, characterized in that the charging device of the auxiliary d.c. voltage source comprises a fourth winding of the transformer.

5. A direct current to alternating current converter as claimed in claim 3, characterized in that the series arrangement comprising the capacitor and the rectifier also includes a resistor, and the charging device comprises a coil in series with both the said first and second series arrangements, and the capacitance of the capacitor is so low that the current blocking is effected by a low voltage value of the auxiliary d.c. voltage source.

6. A combination of a direct current to alternating current converter as claimed in claims 1 or 2 having an output frequency of more than 10 kHz and at least one discharge lamp connected to the output transformer of the converter.

7. A combination as claimed in claim 6 further comprising a full-wave rectifier auxiliary device having two input terminals connected to a low frequency AC source of voltage and two output terminals respectively connected to the two input terminals of the converter.

8. A combination of a DC to AC converter as claimed in claim 3 having an output frequency of more than 10 KHz and at least one discharge lamp connected to a secondary winding of the output transformer.

9. A combination of a DC to AC converter as claimed in claim 4 having an output frequency of more than 10 KHz and at least one discharge lamp connected to a secondary winding of the output transformer.

10. A converter circuit comprising a pair of input terminals for connection to a source of periodically varying DC voltage, a transformer having a primary winding, a secondary winding and a third winding, first and second transistors each having a control electrode, means connecting the first transistor and a first part of the transformer primary winding in a first series circuit to said input terminals, means connecting the second transistor and a second part of the transformer primary winding in a second series circuit to said input terminals, means directly connecting the control electrodes of said first and second transistors to respective end terminals of said third winding, an auxiliary DC voltage source, and a control circuit coupled to the control electrodes of the first and second transistors and to the auxiliary DC voltage source so that the combination of the auxiliary DC voltage source and the control circuit is operative to inhibit current flow from the auxiliary DC voltage source to the first and second transistors when the voltage across said input terminals drops below a given value substantially less than rated effective voltage of said terminals.

11. A converter circuit as claimed in claim 10 wherein said control circuit includes an auxiliary transistor coupling said auxiliary DC voltage source to the control electrodes of said first and second transistors, said auxiliary transistor having a second control circuit coupled to said input terminals and operative so that the auxiliary transistor is conductive when the voltage at the input terminals is above said given value and is substantially non-conductive when said voltage at the input terminals is below said given value.

12. A converter circuit as claimed in claims 10 or 11 wherein the auxiliary DC voltage source comprises a capacitor, a rectifier connected in series circuit with the capacitor, and means coupling said series circuit to a part of the converter circuit which provides a charge current for said capacitor during operation of the converter circuit.

13. A converter circuit as claimed in claim 12 wherein said part of the converter circuit comprises a fourth winding of the transformer.

14. A converter circuit as claimed in claim 12 further comprising a resistor connected in the series circuit with the capacitor and rectifier, and wherein said part of the converter circuit comprises an inductor connected in series with said first and second series circuits.

15. A converter circuit as claimed in claims 10 or 11 wherein the first and second transistors are connected in a push-pull configuration and further comprising a capacitor coupled to the transformer to form a resonant circuit therewith thereby to derive a self-oscillating converter at a frequency substantially higher than 60 Hz, and means for coupling the transformer secondary winding to at least one discharge lamp.

16. A converter circuit is claimed in claims 10 or 11 further comprising a second pair of input terminals for connection to a low frequency source of AC voltage, and a rectifier circuit coupled between said first and second pairs of input terminals for supplying a periodic pulsating DC voltage to the first pair of input terminals.

17. A converter circuit is claimed in claim 15 further comprising a second pair of input terminals for connection to a low frequency source of AC voltage, and a relatively unfiltered rectifier circuit coupled between said first and second pairs of input terminals for supplying a periodic pulsating DC voltage to the first pair of input terminals.

18. A converter circuit as claimed in claims 10 or 11 further comprising a capacitor coupled to the transformer primary winding to form a parallel resonant circuit and of a value such that the converter circuit oscillates at a frequency of at least 10 KHz.

* * * * *

UNITED STATES PATENT AND TRADEMARK OFFICE
CERTIFICATE OF CORRECTION

PATENT NO. : 4,353,116
DATED : October 5, 1982
INVENTOR(S) : Hilbert Palmers and Hubertus M.J. Chermin It is certified that error appears in the above—identified patent and that said Letters Patent is hereby corrected as shown below:

Col. 4, line 36, delete "is at the same time" and insert --forms--

Col. 7, line 14, delete "by" and insert --to--

Signed and Sealed this

Third Day of May 1983

[SEAL]

Attest:

GERALD J. MOSSINGHOFF

Attesting Officer     Commissioner of Patents and Trademarks